United States Patent
Johansen

(10) Patent No.: US 9,976,778 B2
(45) Date of Patent: May 22, 2018

(54) INTEGRATED HOOK AND FLASHING FOR PHOTOVOLTAIC MODULE INSTALLATION ON TILE ROOFS

(71) Applicant: SolarCity Corporation, San Mateo, CA (US)

(72) Inventor: Emil Johansen, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days. days.

(21) Appl. No.: 14/882,375

(22) Filed: Oct. 13, 2015

(65) Prior Publication Data

US 2016/0105143 A1   Apr. 14, 2016

Related U.S. Application Data

(60) Provisional application No. 62/063,266, filed on Oct. 13, 2014.

(51) Int. Cl.
   *F24J 2/52*    (2006.01)
   *H02S 20/23*   (2014.01)
   *H02S 20/25*   (2014.01)

(52) U.S. Cl.
   CPC ........... *F24J 2/5247* (2013.01); *F24J 2/5245* (2013.01); *H02S 20/23* (2014.12); *H02S 20/25* (2014.12); *Y02B 10/12* (2013.01); *Y02B 10/20* (2013.01); *Y02E 10/47* (2013.01)

(58) Field of Classification Search
   CPC ........ F24J 2/5243; F24J 2/4245; F24J 2/5247; F24J 2/5249; H02S 2/23; H02S 2/25; H02S 20/23; H02S 20/25

USPC .......... 248/237, 300; 52/173.3, 24, 712, 547
   See application file for complete search history.

(56) References Cited

U.S. PATENT DOCUMENTS

| | | | | |
|---|---|---|---|---|
| 2,753,054 A | * | 7/1956 | Becher | A47G 29/08 211/73 |
| 4,460,147 A | * | 7/1984 | Macbain | F16B 12/22 248/222.41 |
| 4,473,316 A | * | 9/1984 | Welch | F16B 12/22 248/222.41 |
| 5,079,889 A | * | 1/1992 | Wright | E04D 1/34 52/541 |
| 5,533,313 A | * | 7/1996 | Pike | E04D 1/34 52/521 |
| 5,722,212 A | * | 3/1998 | Struve | E04D 1/34 52/489.1 |

(Continued)

FOREIGN PATENT DOCUMENTS

| | | | | |
|---|---|---|---|---|
| DE | 102012011969 A1 | * | 9/2013 | ............. F24J 2/5247 |
| EP | 1985944 A1 | * | 10/2008 | ............. F24J 2/5203 |
| WO | WO 2013078533 A1 | * | 6/2013 | ............. F24J 2/5203 |

*Primary Examiner* — Daniel J Troy
*Assistant Examiner* — Guang H Guan
(74) *Attorney, Agent, or Firm* — Kilpatrick Townsend & Stockton LLP

(57) ABSTRACT

A bracket for installing photovoltaic modules on a tile roof. The bracket can have a base portion adapted to sit on a flat roof surface below a tile. A pair of curved portions above the base portion can be supported by a pair of vertical portions. A riser portion can be connected to the pair of curved portion and rising in a direction perpendicular to a roof surface. A flange can be connected to and be perpendicular to the riser portion and parallel to the base.

15 Claims, 7 Drawing Sheets

(56) References Cited

U.S. PATENT DOCUMENTS

| | | | | |
|---|---|---|---|---|
| 6,109,819 A * | 8/2000 | Welch | A47B 13/003 | |
| | | | 248/222.41 | |
| 6,254,048 B1 * | 7/2001 | Ashley | B60T 8/3605 | |
| | | | 248/300 | |
| 6,588,971 B2 * | 7/2003 | Welch | F16B 12/00 | |
| | | | 24/669 | |
| 7,175,140 B2 * | 2/2007 | Johnson | H01Q 1/1221 | |
| | | | 248/124.2 | |
| 7,320,774 B2 * | 1/2008 | Simmons | B28B 7/0082 | |
| | | | 264/162 | |
| 7,568,305 B2 * | 8/2009 | Fanfelle | A01M 31/06 | |
| | | | 248/156 | |
| 8,424,821 B2 * | 4/2013 | Liu | E04D 13/12 | |
| | | | 248/237 | |
| 8,839,575 B1 * | 9/2014 | Liu | H01L 31/0422 | |
| | | | 248/295.11 | |
| 8,844,887 B2 * | 9/2014 | Genschorek | B30B 3/04 | |
| | | | 182/117 | |
| 2009/0025313 A1 * | 1/2009 | Smidt | F24J 2/5205 | |
| | | | 52/173.3 | |
| 2009/0044854 A1 * | 2/2009 | Placer | F24J 2/045 | |
| | | | 136/251 | |
| 2013/0206940 A1 * | 8/2013 | Hopkins | E04G 21/328 | |
| | | | 248/237 | |
| 2014/0339387 A1 * | 11/2014 | Bolze | H01Q 1/1221 | |
| | | | 248/237 | |
| 2015/0060619 A1 * | 3/2015 | Krannich | F24J 2/5247 | |
| | | | 248/237 | |
| 2015/0075100 A1 * | 3/2015 | West | E04B 1/665 | |
| | | | 52/506.05 | |
| 2015/0143760 A1 * | 5/2015 | Daniels | E04D 13/00 | |
| | | | 52/173.1 | |
| 2015/0311854 A1 * | 10/2015 | Goehringer | F24J 2/5203 | |
| | | | 211/41.1 | |
| 2016/0028345 A1 * | 1/2016 | Wares | H02S 20/10 | |
| | | | 136/251 | |
| 2016/0105143 A1 * | 4/2016 | Johansen | H02S 20/23 | |
| | | | 248/237 | |

* cited by examiner

INTEGRATED HOOK AND FLASHING FOR PHOTOVOLTAIC MODULE INSTALLATION ON TILE ROOFS

CROSS-REFERENCES TO RELATED APPLICATIONS

This application claims the benefit of U.S. Provisional Application No. 62/063,266, filed on Oct. 13, 2014, which is incorporated by reference herein.

BACKGROUND OF THE INVENTION

The instant invention relates generally to photovoltaic systems ("PV" or "solar") and in particular to PV mounting systems for tiled roofs.

There are many systems available for mounting photovoltaic (PV) modules to building structures, such as a roof. These systems serve as a rigid interconnection element between a roof and a PV module to hold the modules in place and resist the forces of gravity and wind.

Tile roofs (e.g., concrete, ceramic, etc.) present a unique challenge for installing photovoltaic panels as compared to shingled or composite roofs. This is primarily due to the fact that tiles are rigid, brittle, cannot simply be drilled/nailed/screwed through, and in some cases because they are curved. In order to provide the requisite stability and resistance to wind, photovoltaic arrays must be directly or indirectly attached to underlying roof surface and into the supporting roof rafters. In order to accomplish this on a tile roof, it is typically necessary to remove one or more tiles to expose the roof surface so that base mounting hardware can be securely attached to the roof deck. Therefore, known solutions for mounting PV panels onto tiled roofs are often relatively more expensive to manufacture as well as potentially far more time consuming compared to the systems used on composite shingle roofs.

One solution to this problem has been a hook that attaches to roof surface, between upper and lower tiles in adjacent courses in the down-roof direction, and then hooks around back over the tile under which the hook is anchored. An example of this is hook 10 shown at FIG. 7. Additional mounting hardware can then be attached to hook 10 via one or more holes or other features located at distal end 12. A disadvantage of this solution is that because of relatively flat and narrow width W of hook 10, it must be relatively thick T to provide the requisite strength. Therefore, the use of conventional tile hooks often requires cutting or breaking off a portion of the elevating stand of the tile over the hook under which the hook must pass. Although effective, this solution is messy, imprecise and potentially requires the use of additional power tools on the roof. Also, in order to provide sufficient strength over it's relatively narrow profile, it must be very thick, increasing the material and transportation costs associated with making and using traditional tile hooks.

Accordingly, there is a need for a robust photovoltaic mounting system for tile roofs that improves upon existing tile hook-based solutions.

BRIEF SUMMARY OF THE INVENTION

Some embodiments of the invention are related to a bracket for supporting photovoltaic modules on a tile roof.

In some embodiments, the bracket can include a base portion adapted to sit on a flat roof surface below a tile; a pair of curved portions above the base portion can be supported by a pair of vertical portions; a riser portion can be connected to the pair of curved portion and rising in a direction perpendicular to a roof surface; and a flange can be connected to and be perpendicular to the riser portion and parallel to the base.

In some embodiments, the base portion can have one or more apertures that allow one or more fasteners to pass through the base portion into a roof surface.

In some embodiments, one of the curved portions can be substantially convex and the other can be substantially concave.

In some embodiments, the pair of curved portions can be adapted to fit between two overlapping tiles in two successive tile courses.

In some embodiments, the flange can float above at least a portion of a roof tile covering the base portion.

In some embodiments, the flange can include one more mounting holes for mounting additional photovoltaic module mounting hardware.

In some embodiments, the bracket can include a base portion; a plurality of vertical portions can extend vertically from the base portion; a plurality of shaped portions can extend horizontally from the plurality of vertical portions; a riser portion can extend vertically from the plurality of curved portions; and a mounting flange can extend in cantilever from riser portion.

In some embodiments, the base portion can have one or more apertures that allow one or more fasteners to pass through the base portion into a roof surface.

In some embodiments, the plurality of shaped portions can be convex and concave curved portions.

In some embodiments, the plurality of shaped portions can be adapted to fit between curved sections of overlapping tiles.

In some embodiments, the flange can include one more mounting holes for mounting additional photovoltaic module mounting hardware.

In some embodiments, the mounting flange can extend horizontally towards the base portion.

In some embodiments, the bracket can include a base portion for attaching to a structure; first and second angled portions can extend vertically from the base portion; a concave member can extend horizontally from the first angled portion; a convex member can extend horizontally from the second angled portion; a riser portion can bridge ends of the concave and convex members; and a mounting flange can extend horizontally from riser portion.

In some embodiments, the base portion can have one or more apertures that allow one or more fasteners to pass through the base portion into a roof surface.

In some embodiments, the convex member can be positioned higher above the base than the concave member.

In some embodiments, the convex member can be configured to fit between overlapping convex sections of adjoining tiles.

In some embodiments, the concave member is configured to fit between overlapping concave sections of the adjoining tiles.

In some embodiments, the riser portion can be configured to extend towards the mounting flange at a joint between the adjoining tiles.

In some embodiments, the mounting flange can extend horizontally from riser portion in a direction towards the base portion.

In some embodiments, the convex and concave members can extend horizontally towards the riser portion.

DETAILED DESCRIPTION OF THE INVENTION

The following description is intended to convey a thorough understanding of the embodiments described by providing a number of specific embodiments and details involving PV mounting hardware for sloped tile roofs. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
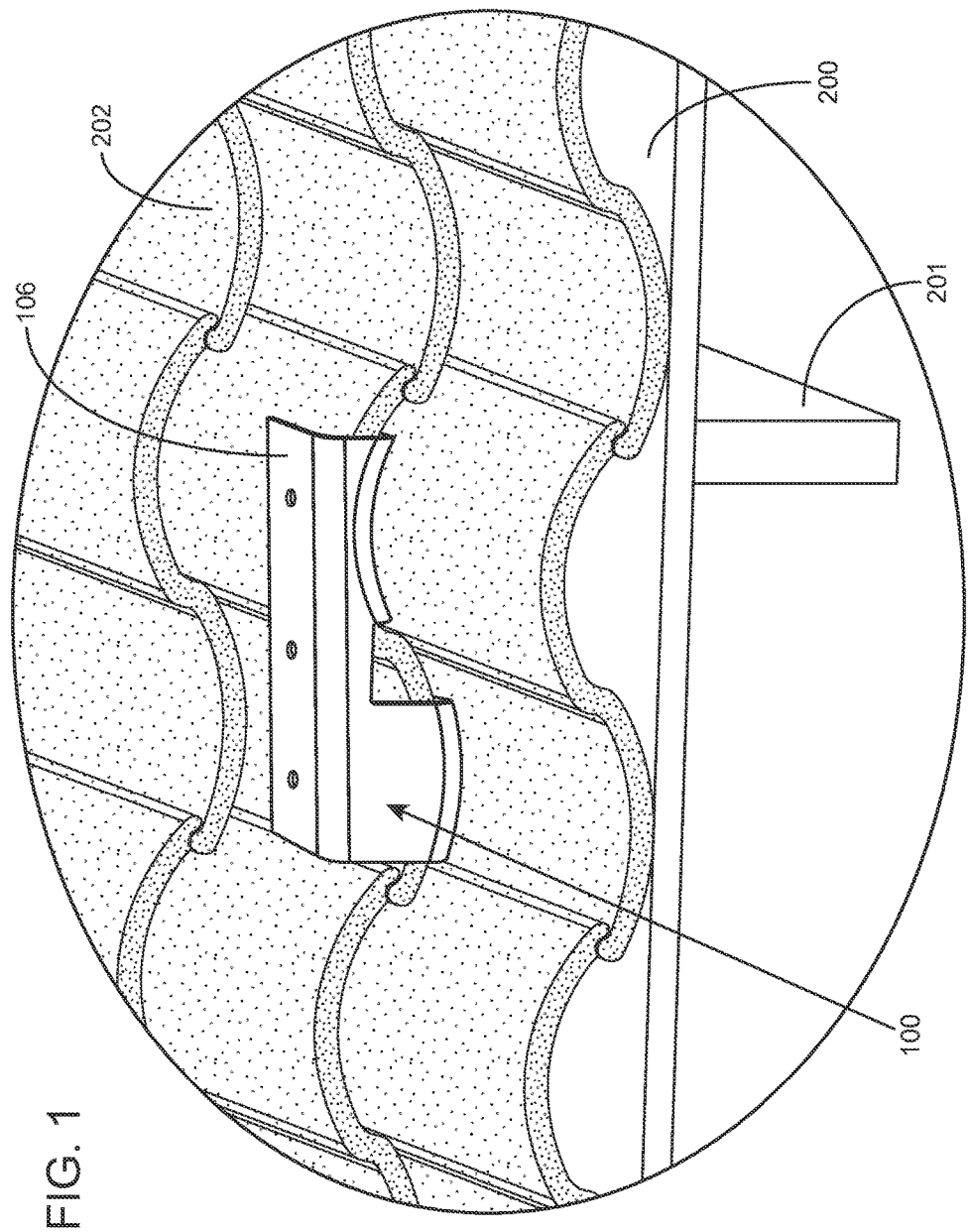
FIG. 1 is a perspective view of a bracket for supporting photovoltaic modules installed on a tile roof, according to some embodiments of the invention.

FIG. 1 illustrates exemplary hook and flashing bracket 100 for photovoltaic module installation on tile roofs according to various embodiments of the invention. Bracket 100 can be a rigid assembly formed from steel, aluminum, or other rigid, corrosion resistant material. In some embodiments, bracket 100 may be press formed from a sheet of material, such as steel or aluminum, and coated or painted with a corrosion resistant material. In other embodiments, bracket 100 may be forged, stamped, cast, molded, assembled, or otherwise formed from a metal, plastic polymer, or fiber/particle reinforced resin. However, the specific manufacturing technique for bracket 100 is not critical to the various inventive embodiments. By creating a hook and flashing that not only prevents water from reaching the roof surface 200, but also that provides structural support by spanning substantially the entire width of a tile, bracket 100 can be thinner than a conventional tile hook, eliminating the need to remove material or cut tiles for installation.

Figure 5:
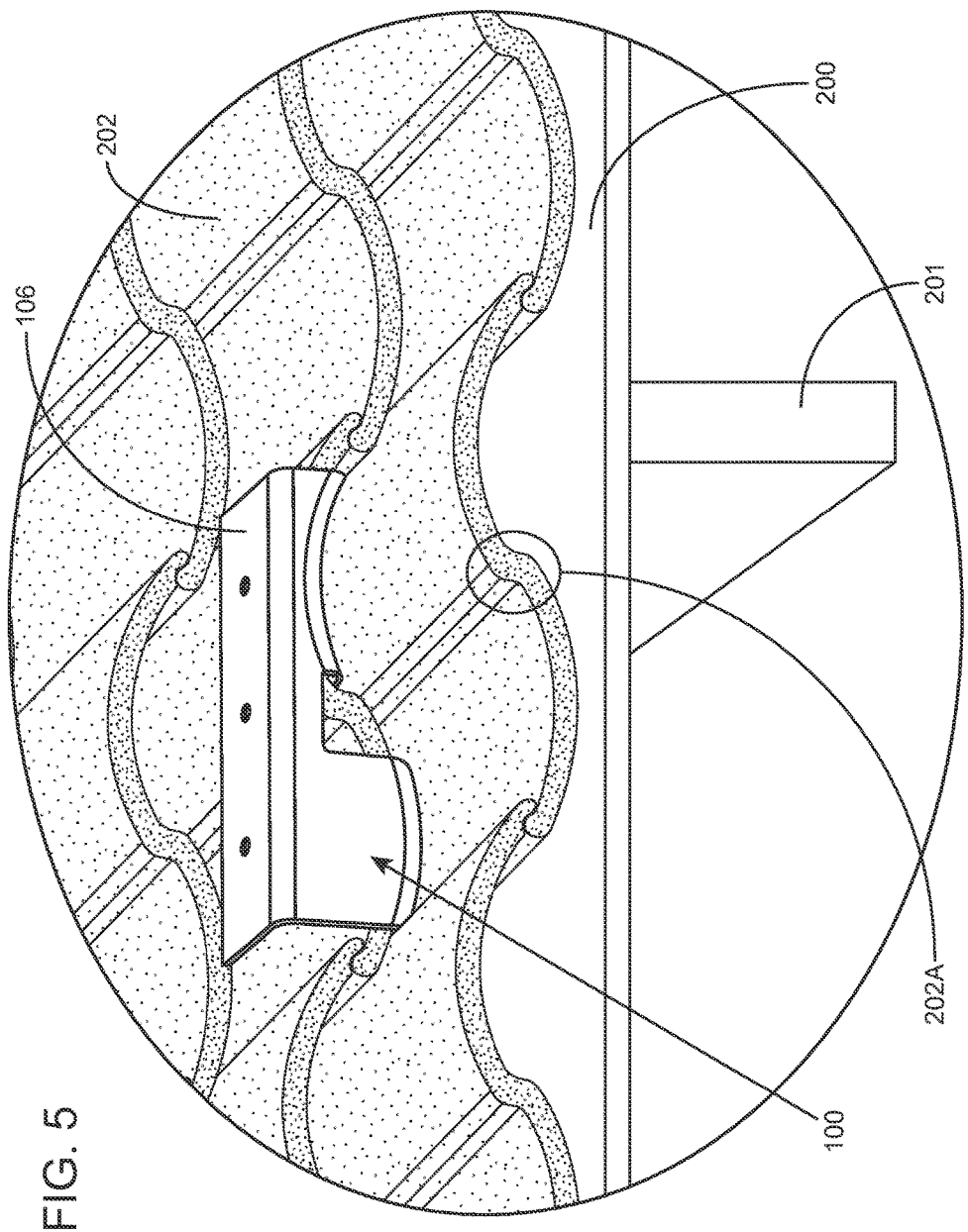
FIG. 5 is another perspective view of the bracket of FIG. 1.

As shown at FIGS. 1 and 5, bracket 100 fits into a course of tiles in a curved tile roof under one of the tiles located above the location of roof rafter 201 (e.g., 2×4, 2×6, 2×8, 2×10 studs supporting the roof surface). In some embodiments, this may require completely removing or simply sliding the tile directly above bracket 100 in the up-roof direction to reveal roof surface 200 so that bracket 100 can be attached to roof surface 200, as discussed in greater detail below. If the tile is simply slid upward under the next up-roof tile, that tile is then returned down-roof until it hits bracket 100, with bracket 100 passing between that tile and the next down-roof tile upon which that tile rests. The tile should return to the same position with respect to the other surrounding tiles in that row. In various embodiments, roof surface 200 can be formed from plywood, composite wood, or other suitable material. In some embodiments, roof surface 200 may also include an outer layer of tarpaper or other vapor barrier (not shown).

Figure 2:
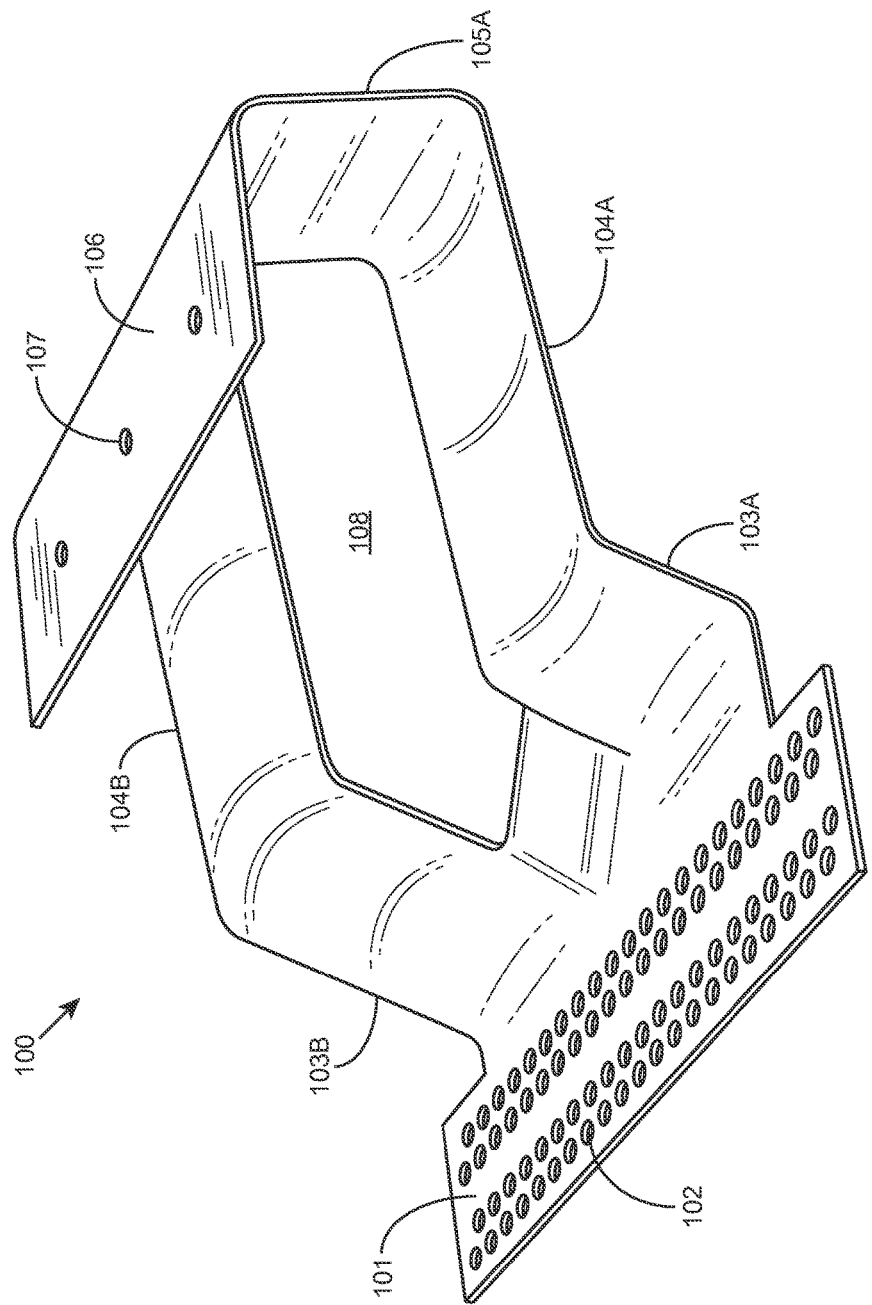
FIGS. 2-4 are perspective views of a bracket for supporting photovoltaic modules on a tile roof, according to some embodiments of the invention.
Figure 3:
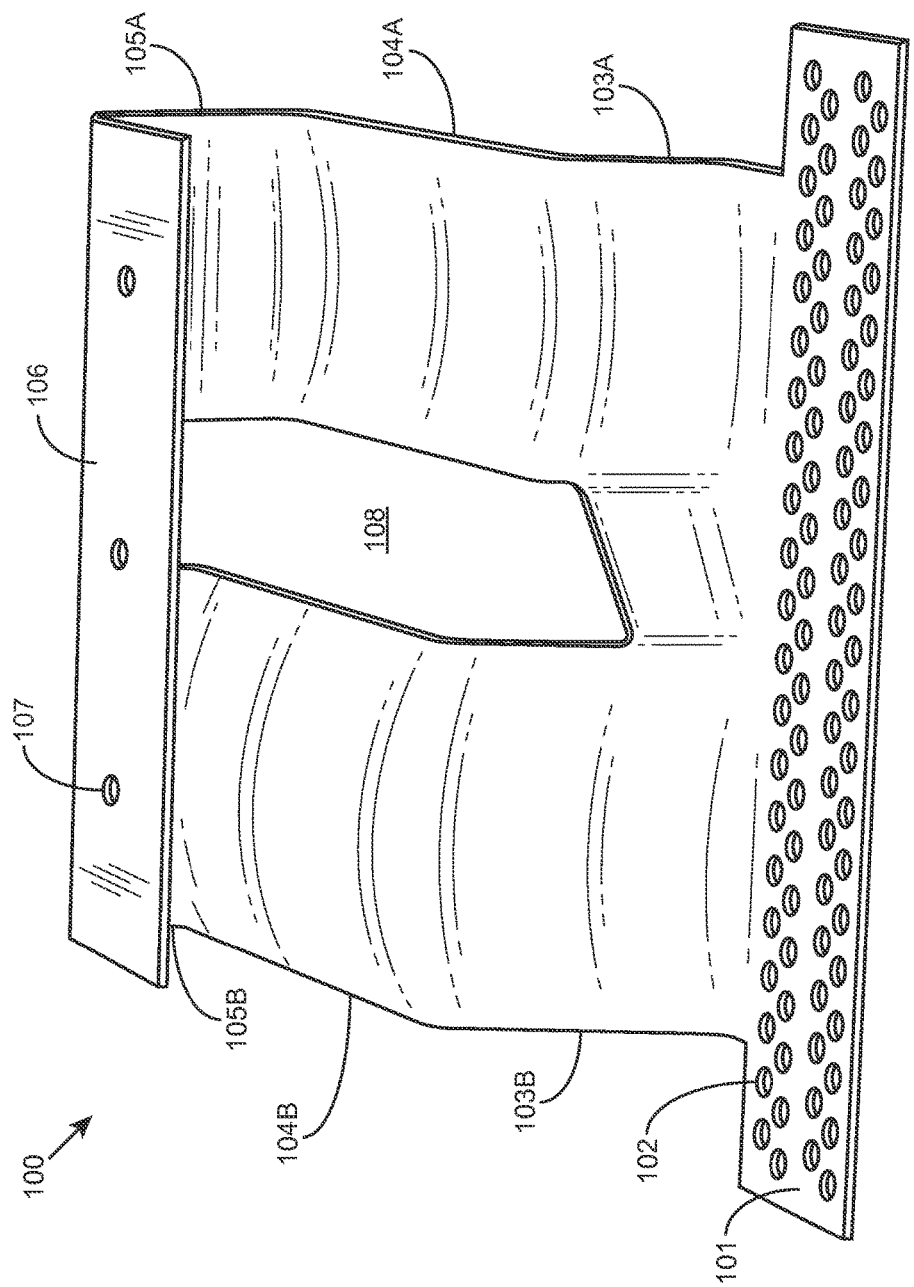
Figure 4:
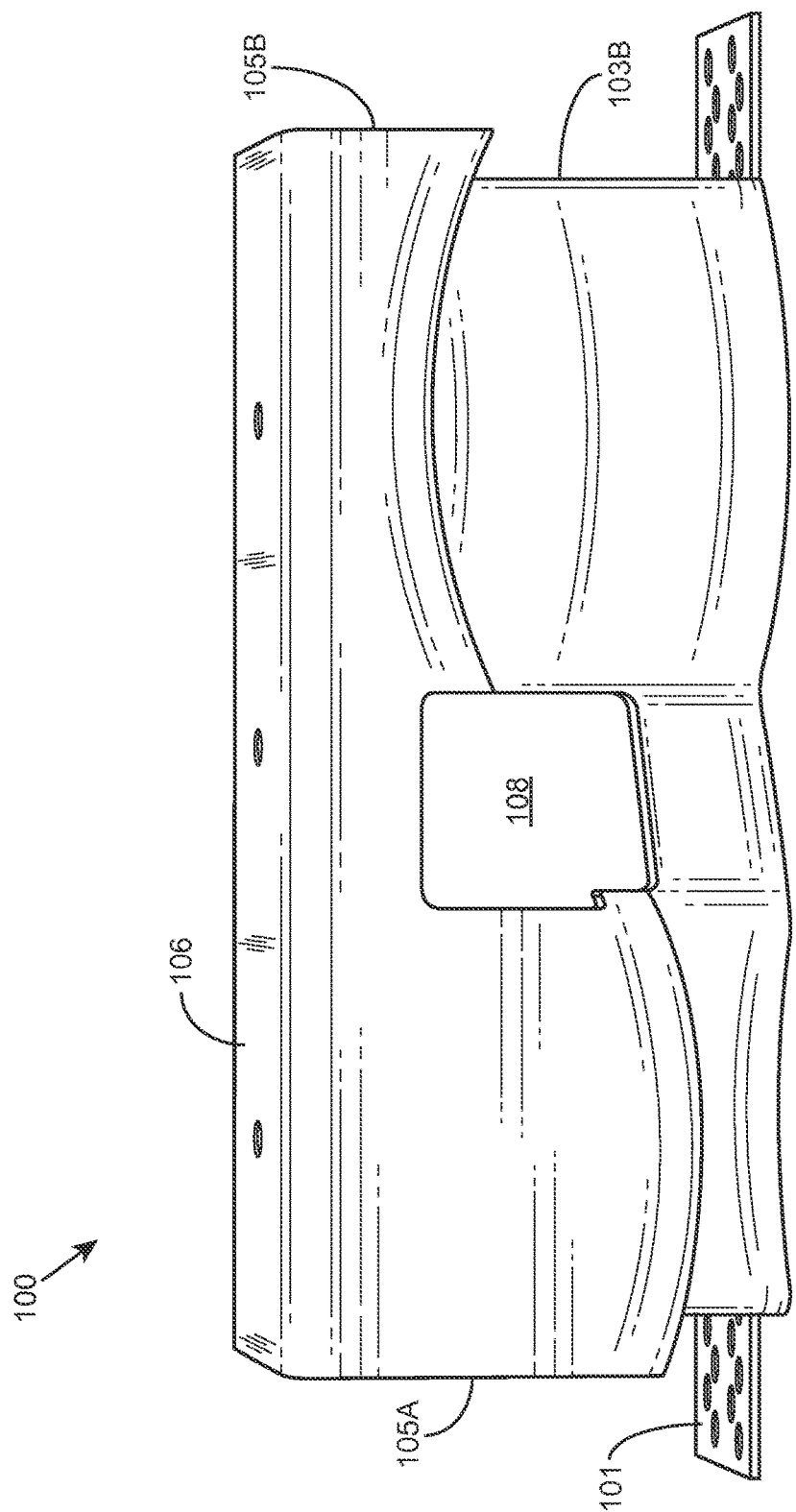

FIGS. 2, 3, and 4 provide isolated views at different angles of bracket 100 according to some embodiments of the invention. Bracket 100 depicted in these figures includes base portion 101 for mounting on a bare roof surface, either directly on wood roof surface 200 or over a layer of tarpaper or other vapor barrier. In some embodiments, base portion 101 will contain apertures 102 running from left to right that enable a number of lag screws or other fasteners to pass through base portion 101 at a various locations ideally penetrating at least one roof rafter 201.

Moving upwards and away from base portion 101, bracket 101 includes portions 103A and 103B that rise up from base portion 101 to stepped curved portions 104A, 104B. Portions 103A and 103B may begin extension towards stepped curved portions 104A, 104B from base portion 101 at different lateral distances in a staggered formation so that they can rise at the same angle with respect to base portion 110 because portion 103B must go higher than 103A since 104B goes over the convex (e.g., upper) section of the down-roof tile while 104A goes over the concave (e.g., lower) portion of the down-roof tile. As best illustrated at FIG. 2, portions 103A and 103B can extend at angles with respect to base portion 101, for example ranging from 20-80 degrees. In some embodiments, portions 103A and 103B can extend vertically at perpendicular angles with respect to base portion 101.

In some embodiments, curved portion 104A is concave and curved portion 104B is convex so that they fit between the lower and upper portions of first and second curved tiles, such as tiles 202 shown in FIGS. 1 and 2. To that end, in some embodiments, the height of portion 103A is less than the height of portion 103B to account for the relative heights of the lower and upper portions of a curved tile with respect to the roof surface 200. This is particularly visible in FIG. 4, which shows a front view of bracket 100.

FIG. 4 also illustrates the downward and upward curves dimensioned to match the curves of the upper and lower tiles caused by concave curved portion 104A and convex curved portions 104B. Opening 108 formed in bracket 100 allows the structure to fit around the mid-point of a tile where the tile changes from concave to convex, i.e., at point 202A in FIG. 5. Because of the vertical transition shown in this figure, this portion is typically thicker than the remainder of a tile.

In the embodiment shown, concave curved portion 104A is located to the left of convex curved portions 104B, as depicted in the view of FIG. 3. Thus, concave curved portion 104A and convex curved portions 104B can fit under a single tile. However, in some embodiments, concave curved portion 104A can be located to the right of convex curved portions 104B, and thus fit under tiles patterned in the opposite direction of tiles 202 or fit between laterally adjacent tiles 202. In addition, in some embodiments, concave curved portion 104A can be arranged to be higher than convex curved portions 104B, instead of lower as illustrated, again to be compatible with different tiles and/or arrangement of tiles. Other shapes of concave curved portion 104A and convex curved portions 104B are possible to match any type of common undulating tile pattern, such as wave tiles, S-tiles, etc.

Continuing from curved portions 104A and 104B, away from base 101, bracket 100 again rises vertically around opening 108 via vertical portions 105A, 105B. As shown in FIG. 4, in various embodiments, vertical portion 105A is larger than portion 105B so that the two portions terminate at a common height into support flange 106. Vertical portions 105A, 105B can bridge to one another before meeting support flange 106. In various embodiments, support flange 106 floats above tiles 202 in a plane that is generally parallel with both base 101 and the roof surface 200 (i.e., a same angle as the roof), and therefore perpendicular to vertical portions 105A and 105B. It should be appreciated that flange 106 may included on or more strengthening ribs or other structure under flange 106 or spanning between the underside of flange 106 and vertical portions 105A, 105B to provide greater rigidity.

Flange 106 may include one or more holes, such as holes 107 through which a mounting foot, bar or other photovoltaic module support hardware may be attached. In the example of FIG. 3, three holes are shown, however, it should be appreciated that in other embodiments more or fewer holes may be used. In various embodiments additional mounting hardware is mounted to flange 106 by passing a bolt through the flat surface of flange 106 through one of the holes 107 and attaching a nut to the bolt at the bottom side of flange 106. Alternatively, a bolt may be passed from below up through the bottom of the flange 106 via one of the holes 107 and capped with a nut after passing through a mounting foot or other vertical module support.

To install bracket 100 onto a preassembled tile roof, an installer is required to first remove a tile 202 of the roof for access to roof surface 200 for each system 100 to be installed. Typically, tiles 202 are not bonded to the roof, and therefore can be slid upwards or even completely removed without much difficulty, although care should be taken to avoid damaging tiles 202. In cases of bonded or cemented tiles, some demolition may be required to remove tiles 202. Of course such steps are not required when installing bracket 100 during assembly of a new roof.

Once access to roof surface 200 is made clear, the installer can determine a proper location to permanently attach bracket 100 to roof surface 200. Ideally, at least a portion of base portion 101 lays over roof rafter 201, or other secure roof portions. Interior portions of vertical portions 105A and 105B should be aligned to be parallel with, and slightly down-roof of, an exposed edge of a row of adjacent tiles so that vertical portions 105A, 105B provide clearance for removed tiles to be placed back into location. Whichever tile bracket 100 overlaps with, can also be used as a guide for proper placement. When placed in a tile opening and partially over the down-roof tile on the roof, the curvature of bracket 100 will orient bracket 100 at the optimal location.

After proper placement is determined, the installer can permanently attach bracket 100 to roof surface 200 by use of one or more fasteners, such as lag bolts, through apertures 102. Ideally one or more of the fasteners is attached to roof rafter 201, or some other secure roof portion. By having an entire row of apertures 102 the changes of one or more being over a roof rafter are greatly increased. Water proofing of any holes made into roof surface 200 should also be considered, such as, for example, by applying sealant to the holes prior to driving a screw, lag bolt or other fastener, as well sealing any errant holes that missed the roof rafter. After bracket 100 has been attached to roof surface 200, tiles 202 that have been displaced are placed back into location. Tile 202 should be arranged to overlap concave curved portion 104A and convex curved portions 104B, as depicted at FIGS. 1 and 5.

Vertical displacement of tiles 202 should be inspected at this point. If the overlapping tile is displaced upward such that a gap is present between tiles, caused by bracket 100 lifting the overlapping tile, then tiles should be removed for modification of the installation. For the example, with bracket 100 still attached to roof surface 200, the installer can impart a downward force onto flange 106 to downwardly bend bracket 100 where portions 103A, 103B meet base portion 101, and thus reduce any lifting effect bracket 100 imparts to an overlapping tile. In contrast, if bracket 100 is found to adversely compress the underlapping tile, the installer can impart an upward force onto flange 106 to upwardly bend bracket 100 where portions 103A, 103B meet base portion 101, and thus reduce any compression bracket 100 imparts to an underlapping tile.

After bracket 100 has been properly installed, along with additional similar brackets as necessary, the installer can attach one or more PV module coupling devices to flange 106. A mounting foot, bar, or other PV module support hardware can be attached through holes 107. In various embodiments, this is accomplished by passing a bolt through the flat surface of flange 106 through one of the holes 107 and attaching a nut to the bolt at the bottom side of flange 106. Alternatively, a bolt may be passed from below up through the bottom of the flange 106 via one of the holes 107 and capped with a nut after passing through a mounting foot or other vertical module support.

Figure 6:
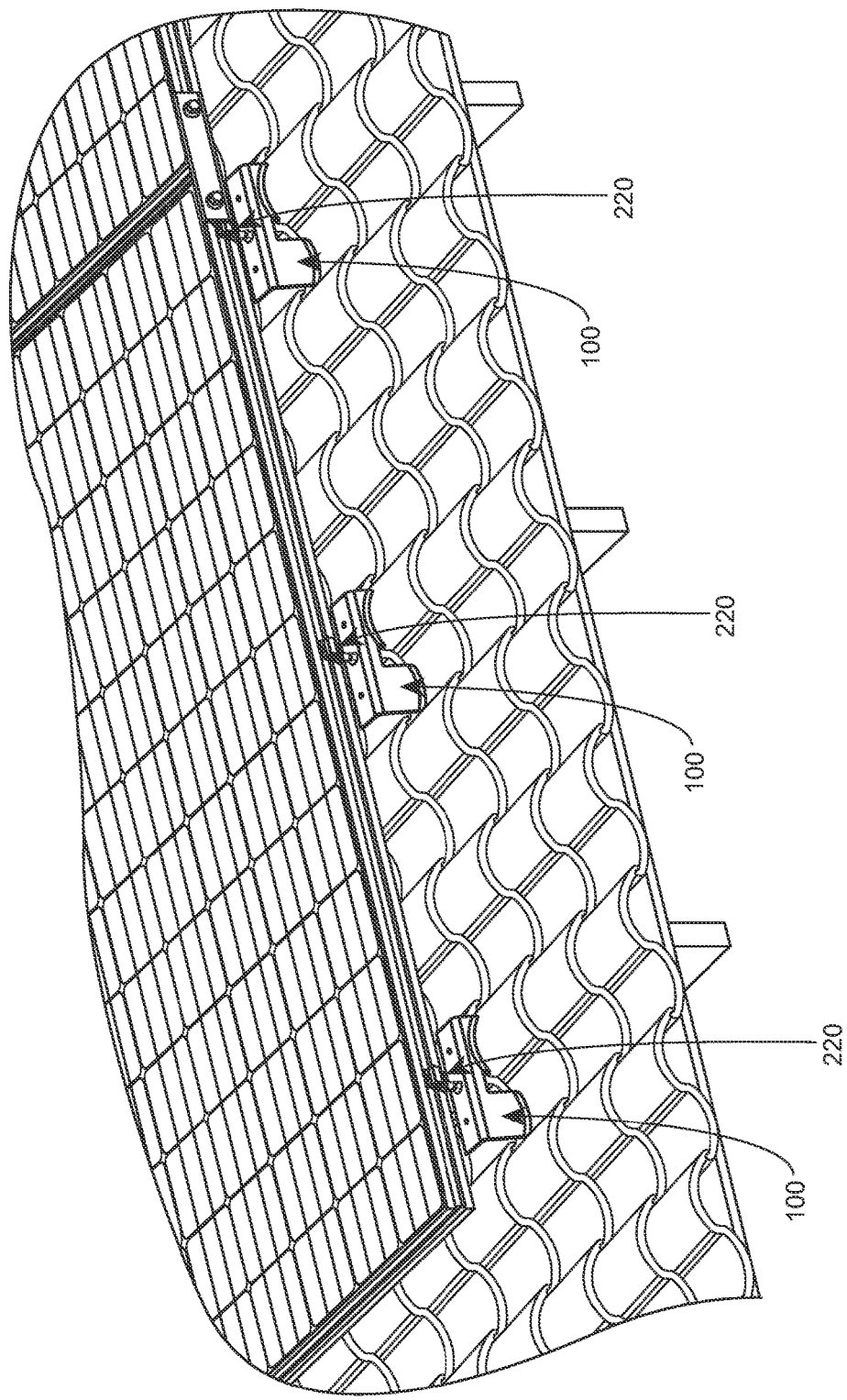
FIG. 6 is a perspective view of brackets supporting photovoltaic modules on a tile roof, according to some embodiments of the invention.
Figure 7:
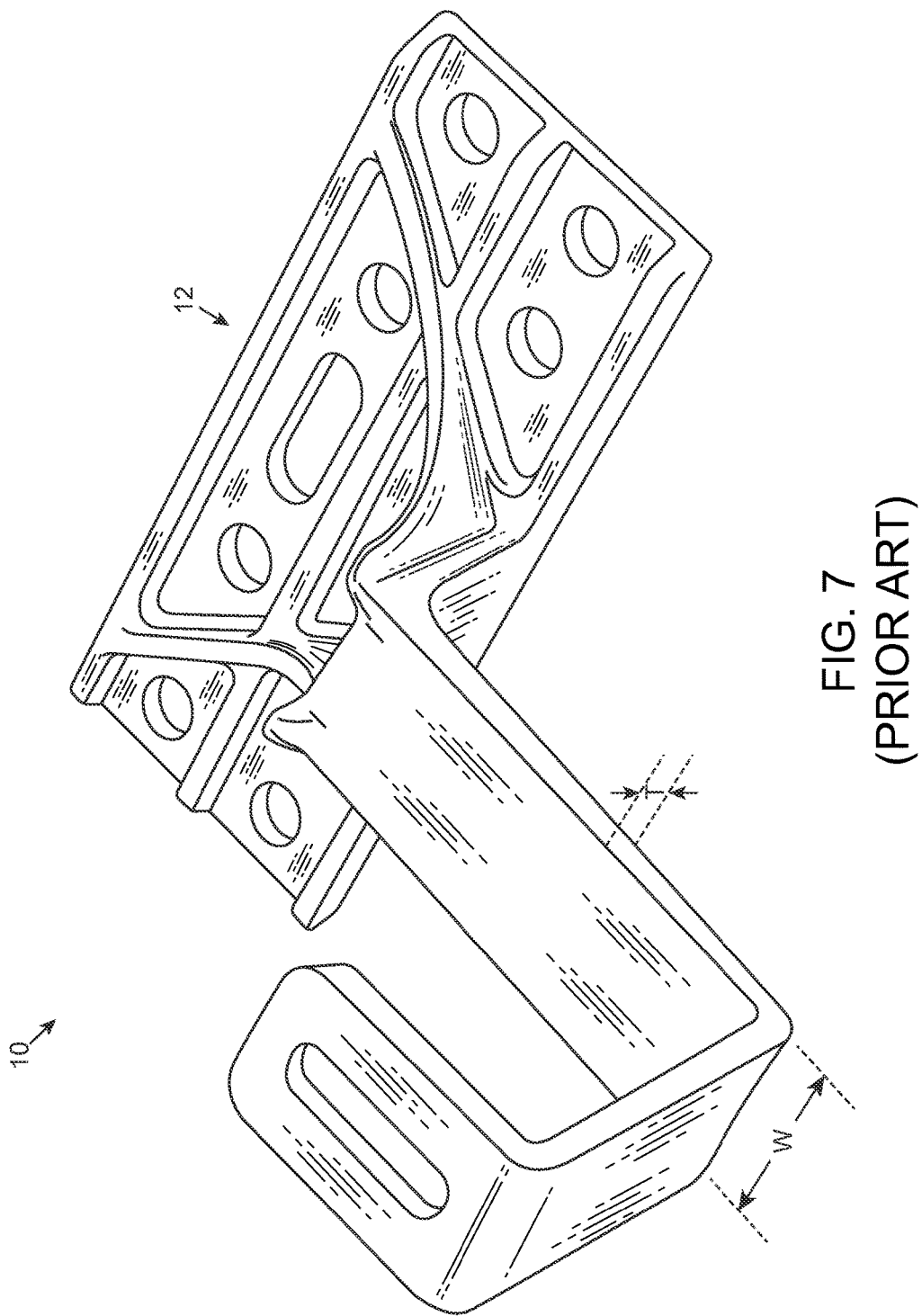
FIG. 7 is a perspective view of a prior art tile hook.

FIG. 6 shows a perspective view of bracket 100 in use, according to some embodiments. Here, brackets 100 have been installed between sets of overlapping tiles, and PV module coupling devices 220 have been secured to brackets 100. PV module coupling device 220 is a "rock-it" style connector manufactured by SolarCity Corp., which is arranged to connect to respective frames of two adjacent PV modules. Such a coupling device is described and illustrated, for example, in commonly assigned U.S. patent application Ser. No. 14/615,320, Publication No. 2015/0155823-A1, the disclosure of which is herein incorporated by reference in its entirety. However, bracket 100 is not limited to use of such a coupling device. A multitude of different styles of coupling devices are compatible with bracket 100. For example, a wrap-around clamping style coupling device may be used with various embodiments of the invention.

The embodiments of the present inventions are not to be limited in scope by the specific embodiments described herein. For example, although many of the embodiments disclosed herein have been described with reference to sloped tile roofs, the principles herein may be equally applicable to other types of roofs. Indeed, various modifications of the embodiments of the present inventions, in addition to those described herein, will be apparent to those of ordinary skill in the art from the foregoing description and accompanying drawings and claims. Thus, such modifications are intended to fall within the scope of this invention. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, this disclosure should be construed in view of the full breath and spirit of the embodiments of the present inventions as disclosed herein and claimed below.

What is claimed is:

1. A bracket for supporting photovoltaic modules on a tile roof, the bracket comprising:
   a base portion configured to contact a flat roof surface along a first plane;

a first curved portion including a first concave surface facing away from the first plane, and a first convex surface, opposite the first concave surface, facing toward the first plane, wherein the first concave surface and the first convex surface extend in a first direction substantially parallel to the first plane;

a second curved portion including a second concave surface facing toward the first plane, and a second convex surface, opposite the second concave surface, facing away from the first plane, wherein the second concave surface and the second convex surface extend in the first direction parallel to the first concave surface and the first convex surface;

a riser portion connecting the first and second curved portions and extending away from the first and second curved portions and the first plane in a second direction substantially perpendicular to the first plane; and a flange connected to and substantially perpendicular to the riser portion and substantially parallel to the first plane, wherein the flange is positioned further from the first plane than the first curved portion and the second curved portion, wherein the first and second curved portions define sides of an opening separating the first and second curved portions, and wherein the bracket is configured for the base portion to be positioned between a first roof tile and the flat roof surface while the first curved portion is positioned between a convex portion of a lower surface of the first roof tile and a concave portion of an upper surface of a second roof tile overlapped by the first roof tile.

2. The bracket of claim 1, wherein the base portion has one or more apertures configured to allow one or more fasteners to pass through the base portion into the flat roof surface.

3. The bracket of claim 1, wherein the second curved portion is further configured to fit between a convex portion of the upper surface of the second roof tile and a concave portion of the lower surface of the first roof tile, while the first curved portion is positioned between the convex portion of the lower surface of the first roof tile and the concave portion of the upper surface of the second roof tile.

4. The bracket of claim 1, wherein a gap is defined by the flange, the riser portion and the first and second curved portions, wherein the gap is configured to receive the first roof tile with the first roof tile positioned between the first curved portion and the flange and between the second curved portion and the flange while the base portion is positioned between the first roof tile and the roof surface and while the first curved portion is positioned between the convex portion of the lower surface of the first roof tile and the concave portion of the upper surface of the second roof tile.

5. The bracket of claim 1, wherein the flange includes one or more mounting holes configured for mounting photovoltaic module mounting hardware.

6. A bracket for supporting photovoltaic modules on a tile roof, the bracket comprising:
a base portion defining a first plane;
a first upwardly extending portion connected to the base and extending away from the first plane in a first direction;
a second upwardly extending portion connected to the base and extending away from the first plane in the first direction;
a first curved portion connected to the first upwardly extending portion, wherein the first curved portion extends away from the first upwardly extending portion in a second direction substantially parallel to the first plane, and wherein the first curved portion includes a concave surface facing away from the first plane;
a second curved portion connected to the second upwardly extending portion, wherein the second curved portion extends away from the second upwardly extending portion in the second direction parallel to the first curved portion, wherein the first and second curved portions define sides of an opening separating the first and second curved portions, and wherein the second curved portion includes a convex surface facing away from the base portion;
a first riser portion extending substantially perpendicularly from the first curved portion in the third direction away from the first plane;
a second riser portion extending substantially perpendicularly from the second curved portion in the third direction away from the first plane; and
a mounting flange connecting the first and second riser portions, wherein the riser portion is positioned further from the first plane than the first and second curved portions.

7. The bracket of claim 6, wherein the base portion has one or more apertures configured to allow one or more fasteners to pass through the base portion into a roof surface.

8. The bracket of claim 6, wherein the first and second curved portions are configured to fit between curved sections of overlapping roof tiles.

9. The bracket of claim 6, wherein the flange includes one or more mounting holes configured to receive mounting photovoltaic module mounting hardware.

10. The bracket of claim 6, wherein the mounting flange extends substantially parallel to the first plane and extends away from the first and second riser portions towards the base portion.

11. A bracket for supporting photovoltaic modules on a tile roof, the bracket comprising:
a base portion for attaching to a structure;
a first angled portion extending in a first direction away from the base portion;
a second angled portion extending in the first direction away from the base portion;
a concave member extending in a second direction, substantially perpendicular to the first direction, away from the first angled portion;
a convex member extending in the second direction away from the second angled portion;
a riser portion bridging ends of the concave and convex members opposite the first and second angled portions; and
a mounting flange extending in a third direction, substantially opposite the second direction, away from the riser portion,
wherein the concave member and the convex member define sides of an opening separating the concave member and the convex member, and
wherein the second angled portion supports the convex member at a position further from the base portion than the second angled portion supports the concave member from the base portion.

12. The bracket of claim 11, wherein the base portion has one or more apertures configured to allow one or more fasteners to pass through the base portion into a roof surface.

13. The bracket of claim 11, wherein the convex member is configured to fit between a concave portion of a lower surface of a first roof tile positioned between the mounting flange and the convex member, and a convex portion of an upper surface of a second roof tile overlapped by the first roof tile.

14. The bracket of claim 13, wherein the concave member is configured to fit between a convex portion of the lower surface of the first roof tile and a concave portion of the upper surface of the second roof tile.

15. The bracket of claim 14, wherein the riser portion is configured to extend towards the mounting flange at a joint between the first and second roof tiles.

* * * * *